UNITED STATES PATENT OFFICE.

EDMOND PRINCE, OF LYON, FRANCE, ASSIGNOR TO SOCIETE CHIMIQUE DES USINES DU RHONE (ANCIENNEMENT GILLIARD P. MONNET ET CARTIER), OF PARIS, FRANCE.

PROCESS FOR PREPARING CELLULOSE ACETATE FOR DYEING.

1,366,023.  Specification of Letters Patent.  Patented Jan. 18, 1921.

No Drawing.  Application filed June 25, 1920. Serial No. 391,590.

*To all whom it may concern:*

Be it known that I, EDMOND PRINCE, of 13 Rue Sala, Lyon, France, chemist, a citizen of the Confederation of Switzerland, have invented a certain new and useful Process for Preparing Cellulose Acetate for Dyeing, of which the following is a specification.

Cellulose acetate not being permeable to water, it is difficult to dye, by the ordinary processes, threads, films or other articles which have the acetate for their basis; the dyed products so obtained are light colored and not uniform.

It is usual to saponify partly the triacetates obtained by direct acetylation. The process described in the American Patent 1,061,771 (Mork) is limited to a partial saponification of acetates having conserved the fibrous structure of the original cellulose.

Mork, in the above indicated patent, uses an alkaline solution (caustic soda, ammonia, carbonate of soda) or acids (hydrochloric, sulfuric).

It is however to be noticed that this manner of proceeding applied to films or silk gives most often bad results, for the deacetylation takes place in an irregular manner; it takes place more or less deeply, and this provokes inequalities in the dyeing, which is a serious defect. Besides, the silk thread loses during the said treatment a great portion of its brightness, which is also a serious drawback.

The applicant has verified, and this is the object of the present invention, that when acetate of cellulose or the silk or the films or like materials the basis of which is acetate of cellulose are treated by hot or cold relatively concentrated solutions of alkali or other metal salts, such as chlorids, sulfates, acetates and the like, to which a more or less considerable quantity of alkali is added, one obtains products which can easily be dyed with most dyes by ordinary processes. Moreover, and this is of great importance and constitutes a considerable progress on the Mork process, one obtains in this manner the following results, which it was not possible to foresee.

1. The deacetylation is performed in a very regular manner on the whole surface, which allows of a uniform tint being obtained.

2. The silk thread retains after the alkaline treatment, the totality of its initial brightness.

3. The resistance of the silk thread is not diminished but on the contrary it is increased and the silk retains all the qualities inherent to cellulose acetate.

*Example.*

A hank of two hundred grams of cellulose acetate silk is plunged into 8000 c. c. of a solution of 25% sodium chlorid, to which 5 grams of pure caustic soda has been added.

The hank is smoothed with care in the bath heated to about 50° C., until the caustic soda is entirely combined, which occurs after a treatment of from 15 to 20 minutes.

The silk is then withdrawn from the salt bath, rinsed with cold water and subjected to dyeing.

What I claim and desire to secure by Letters Patent is:—

1. A process for preparing cellulose acetate for dyeing, characterized in that the cellulose acetate is first treated with a relatively concentrated solution of alkali metal salts soluble in water, to which an alkali is added.

2. A process for preparing cellulose acetate for dyeing, characterized in that the cellulose acetate is first treated with a relatively concentrated common salt solution to which an alkali is added.

3. A process for preparing cellulose acetate for dyeing, characterized in that the cellulose acetate is first treated with a relatively concentrated common salt solution to which caustic soda is added.

4. The process for preparing cellulose acetate for dyeing, consisting in plunging a hank of cellulose acetate silk in a solution of 25% sodium chlorid to which pure caustic soda has been added, the proportion being 8000 c. c. of the solution with 5 grams of caustic soda for a hank of 200 grams of silk, smoothing the hank in the bath heated to approximately 50° C. until the caustic soda is entirely combined, withdrawing the silk and rinsing it with cold water.

In testimony whereof I have signed my name to this specification.

EDMOND PRINCE.

In presence of—

JULIAN KEMBLE LUEBERG.